Patented Apr. 20, 1926.

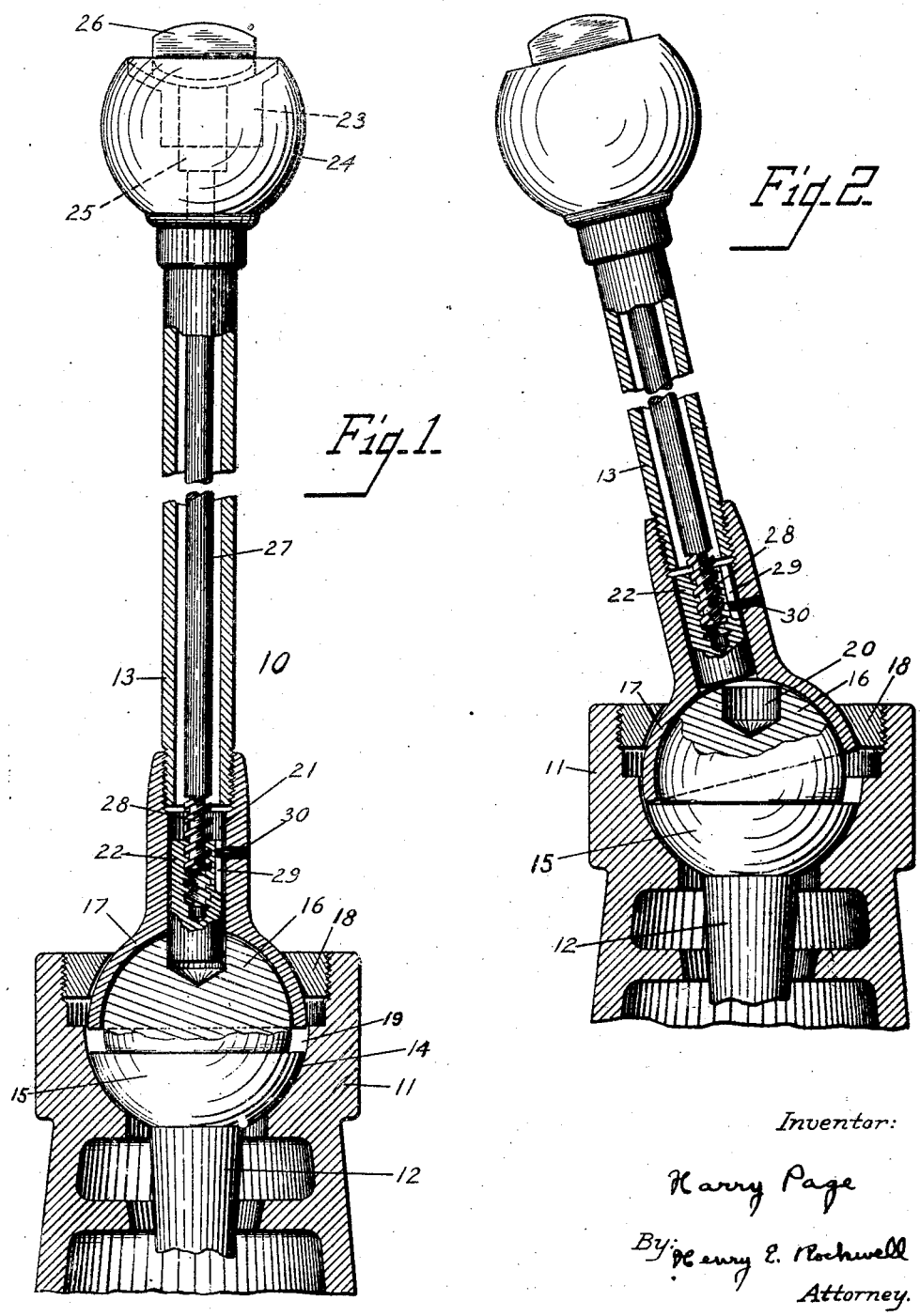

1,581,285

UNITED STATES PATENT OFFICE.

HARRY PAGE, OF EAST HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS AND THE LIKE.

Application filed December 19, 1919. Serial No. 345,993.

*To all whom it may concern:*

Be it known that I, HARRY PAGE, a citizen of the United States, and residing in East Haven, county of New Haven, State of Connecticut, have invented certain new and useful Improvements in Locks for Gear-Shift Levers and the like, of which the following is a full, clear, and exact description.

This invention relates to key controlled means for preventing the unauthorized manipulation of the gear shift lever of an automobile.

The primary object of my invention is to provide a jointed lever which is so constructed that one portion of the same may be operated without operating the entire lever, except when the separate portions of the lever have been rigidly secured together by key controlled means.

A more specific object of my invention is to provide a jointed gear shift lever consisting of a gear shifting portion enclosed within a supporting bracket and a manually engageable portion swingingly secured to the gear shifting portion so that one portion of the lever may be moved without moving the other portion, and to provide key operable means for rigidly securing the portions together when desired.

To these and other ends, the invention consists in the novel features and combinations of parts to be hereinafter described and claimed.

In the accompanying drawing:

Fig. 1 is a longitudinal sectional view through a jointed gear shift lever and its supporting bracket, showing the parts in their operative position; and Fig. 2 is a view similar to Fig. 1, but showing the parts in their inoperative position with the upper portion of the lever swung over to one side.

In the drawing, I have used the numeral 10 to designate in its entirety the jointed gear shift lever, and I have shown this lever as swingingly mounted in a supporting bracket 11. The jointed lever 10 consists of a gear shifting portion 12 housed within the bracket and a manually engageable portion 13 swingingly secured to the portion 12 and movable independent thereof, the arrangement being such that normally the operation of the portion 13 of the gear shift lever will operate the portion 12, and the gear mechanism (not shown) controlled thereby.

In the embodiment of my invention shown, the supporting bracket 11 is provided with a substantially spherical socket 14 and in this socket is swingingly mounted the substantially spherical bearing member 15 formed upon the upper end of the portion 12 of the gear shift lever, and in order to rockingly mount the upper portion 13 of the gear shift lever upon its lower portion 12, I have provided the bearing member 15 with a reduced substantially spherical portion 16 adapted to be received in a similarly shaped socket formed in the lower end 17 of the manually engageable portion 13. The outside of the shell-like portion 17 preferably has the same diameter as the bearing member 15, in order to properly conform to the curvature of the socket 14 so that the jointed lever 10 when the upper and lower portions are rigidly secured together will freely swing within its supporting bracket 11. A threaded gland nut 18 having threaded engagement with the upper end of the bracket 11 is provided to retain the gear shift lever 10 properly seated within its bracket, and this gland nut serves also to keep the shell-like portion 17 properly seated upon the rounded head 16 of the gear shifting portion 12. In order that the manually engageable portion 13 of the gear shift lever may be freely rocked upon the gear operating portion 12 without moving the latter, it is necessary that a fairly large clearance space, such as designated by the numeral 19, be provided between the upper face of the bearing member 15 and the lower face of the shell-like member 17.

In order to provide key controlled means for rigidly securing the upper and lower portions of the gear shift lever 10 together, so that the same may be operated in its entirety, I have formed a socket 20 in the spherical member 16 and within the lower end of the portion 13 of the gear shift lever is formed a relatively large passage-way 21 in which the bolt 22 is slidably mounted, the arrangement being such that when the bolt is moved downwardly into the socket 20, the portions 12 and 13 of the gear shift lever will be rigidly connected together, as shown in Fig. 1, and when the bolt 22 has been retracted to disengage the same from the socket 20, the portion 13 of the gear shift lever may be freely rocked, as shown in Fig. 2, without moving the lower portion 12.

The key controlled means which I have provided for imparting longitudinal movement to the sliding bolt 22 consists of a cylinder lock 23 mounted within the knob 24 and this cylinder lock is provided with a key barrel 25 preferably having a projection 26 upon the outer end of the same adapted to be grasped between the fingers to rotate the key barrel. To the lower end of the key barrel 25 is rigidly secured a relatively long pin 27 and the lower end of this pin is provided with coarse threads 28 adapted to be received in a correspondingly threaded socket formed within the bolt 22. In order to prevent the bolt 22 from rotating within its passage-way 21, I have shown this bolt as provided with a key-way 29 adapted to slidably receive the inner end of the pin 30.

From the above description when read in connection with the drawing, it will be apparent that during the operation of the automobile the sliding bolt 22 is retained by its key barrel in the position shown in Fig. 1 to rigidly connect the upper and lower portions of the gear shift lever together in order that the gears may be shifted as desired, but when it is desired to leave the automobile standing, the gear shift lever 10 may easily be rendered inoperative by simply rotating the key barrel 26 to retract the bolt 22, as shown in Fig. 2, whereupon the transmission gears can no longer be shifted by operating the upper portion 13 of the gear shift lever.

It will be apparent that various changes may be made in the structure herein disclosed for coupling the sections 12 and 13 of the gear shift lever together, and it will also be apparent that various key controlled means other than herein disclosed may be used for rigidly connecting these sections together without departing from the spirit of my invention, as defined in the annexed claim.

What I claim is:

In a device of the character described, a bracket having a spherical socket, a gear shifting member having a lower spherical portion seated in the socket, and an upper reduced spherical portion projecting therefrom, a manually engageable lever having at its lower end a shell-like portion to fit over the reduced spherical portion of the gear fitting member, and a relatively large longitudinal passageway communicating with said shell-like portion, the upper end of said lever being hollow and its bore communicating with said passageway, a bolt mounted in said passageway having a slot in the side thereof, a pin passing through the lever and being seated in said slot to prevent rotation of the bolt, said bolt having a threaded socket in its upper end, a key controlled rotatable rod mounted in the upper end of the lever and having at its lower end a threaded portion to enter said threaded socket and thereby move said bolt longitudinally of the lever, and the reduced spherical portion of the gear shifting member having a socket to receive said bolt to connect the gear shifting member to the manually engageable lever.

In witness whereof, I have hereunto set my hand on the 15 day of December, 1919.

HARRY PAGE.